United States Patent [19]

Gidwani et al.

[11] Patent Number: 5,252,965
[45] Date of Patent: Oct. 12, 1993

[54] CHANGING ONE OF MANY ACCESS CODES UPON REMOVAL OF IGNITION KEY

[75] Inventors: Sachal B. Gidwani, Carmel; Kenneth R. Campbell, Kokomo; Eric L. Slone, Indianapolis, all of Ind.

[73] Assignee: Delco Electronics Corporation, Kokomo, Ind.

[21] Appl. No.: 669,708

[22] Filed: Mar. 15, 1991

[51] Int. Cl.$^5$ .............................................. H04Q 1/00
[52] U.S. Cl. .......................... 340/825.56; 340/825.31; 340/825.34
[58] Field of Search ....................... 340/825.56, 825.31, 340/825.34, 825.54; 307/10.2; 455/343; 540/825.69

[56] References Cited

U.S. PATENT DOCUMENTS

| | | | |
|---|---|---|---|
| 4,163,215 | 7/1979 | Iida | 340/149 |
| 4,754,255 | 6/1988 | Sanders | 340/825.31 |
| 4,766,746 | 8/1988 | Henderson | 340/825.31 |
| 4,829,296 | 5/1989 | Clark et al. | 340/825.31 |
| 4,881,148 | 11/1989 | Lampcopoulos | 307/10.2 |
| 4,955,038 | 9/1990 | Lee et al. | 375/35 |
| 4,973,958 | 11/1990 | Hirano | 340/825.69 |

FOREIGN PATENT DOCUMENTS 0068437 10/1986 European Pat. Off. .
0077101 10/1986 European Pat. Off. .
3031405 4/1982 Fed. Rep. of Germany .

Primary Examiner—Donald J. Yusko
Assistant Examiner—Brian Zimmerman
Attorney, Agent, or Firm—Robert M. Sigler

[57] ABSTRACT

A system for unlocking any of several vehicles by a passive electronic key coupled to base units in the vehicles by a radio link uses short range LF transmission for signals to the key and VHF transmission for signals to the base units. The key has a ferrite antenna connected to a receiver comprising a comparator. When an operator pulls the door handle, codes stored in the base are transmitted to identify any authorized key within the range. The key has a memory partitioned into separate blocks for different base units and another block for a scratchpad memory. A state machine stores the block addresses and controls access to the blocks according to the transmitted codes. When a block is accessed, a secure ID in the block is sent to the base unit to verify that the key is authorized to unlock the vehicle. The ID can be updated upon command from the base unit using the same codes to assure that an authorized unit is receiving the new ID. The new ID is written to the scratchpad, verified for correctness, and the scratchpad address is exchanged for the address of the block containing the old ID. Auxiliary data specific to the vehicle or to the user of the electronic key may also be stored in the memory blocks and retrieved along with the ID.

2 Claims, 4 Drawing Sheets

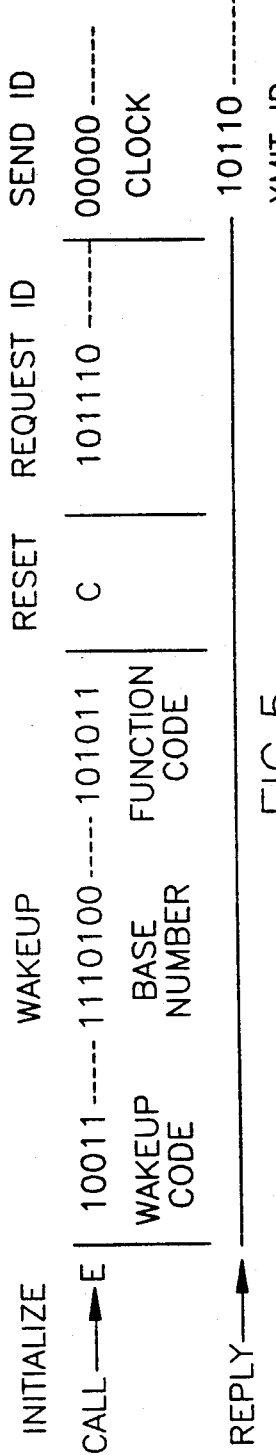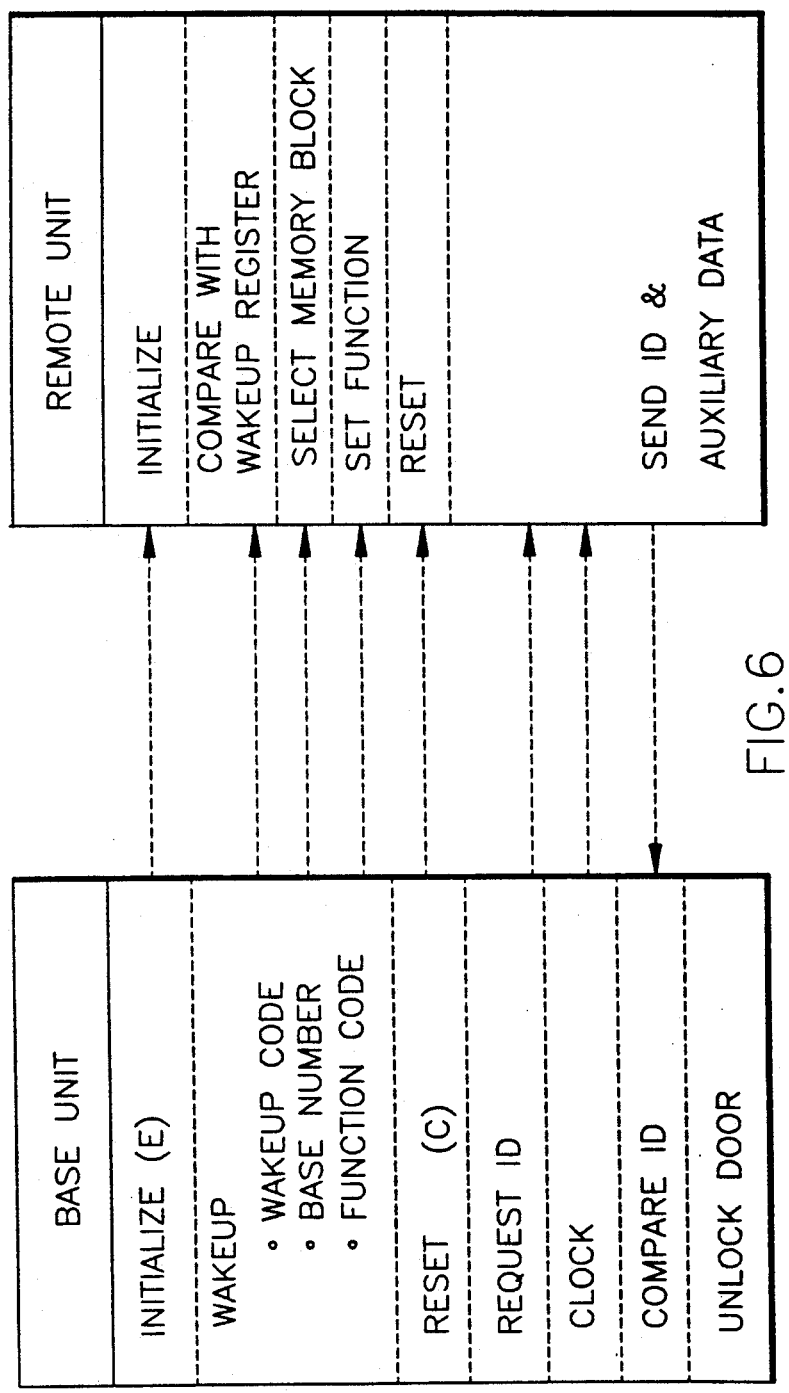
FIG.5
FIG.6

CHANGING ONE OF MANY ACCESS CODES UPON REMOVAL OF IGNITION KEY

FIELD OF THE INVENTION

This invention relates to secure communication between a remote station and a plurality of base stations and particularly for controlling a function in at least one of the base stations.

BACKGROUND OF THE INVENTION

It is known to open or unlock the door of a vehicle or perform another function by operation of a miniature remote unit or electronic key which is generally carried on the key chain of the vehicle operator. By pressing a button on the remote unit a coded radio signal is transmitted to a base unit on the vehicle and, if it recognizes the code as an authorized code, the base unit unlocks the door or performs another prearranged function. It is recognized that such systems are not limited to controlling vehicle functions but might as well control garage doors, security gates, or home entry, for example.

Since it is a common practice for an operator to use more than one vehicle it is desirable to provide the remote unit with the capability of separately controlling several different base units mounted in different vehicles or in non-vehicular stations. This would avoid the necessity of carrying or obtaining a separate remote unit for each base station. It is also desirable to avoid handling the electronic key and pushing the button to activate the unit since it is sometimes inconvenient to do so. To carry out a passive control which needs no button, it has been proposed to provide a system in which the mere presence of the electronic key in the immediate vicinity of the base station is sufficient to activate the base station function. In conjunction with the presence of the electronic key it is generally preferred to require a positive act, such as pulling on the door handle, to actuate the system. A further consideration in designing such a system is the battery life for the remote unit. Since a miniature electronic key is required the battery must be small, and the unit must then be very conservative of energy to operate for an extended period. In that context, a battery life of many years is desired even though the unit is used for the control of several base stations.

SUMMARY OF THE INVENTION

It is therefore an object of the invention to provide a system for control of a plurality of base stations by a miniature remote unit.

The invention is carried out by a system for secure entry to a plurality of base stations comprising: a plurality of base units, one for each base station, for controlling a station function and at least one remote unit coupled to the base units for communication therewith, each base unit storing a unique base number and a secure remote ID, the remote unit having a memory partitioned into assigned memory blocks one for each base unit and an additional temporary memory block, each assigned memory block containing a secure ID, the remote unit further having logic means for selectively assigning a base number to each memory block and for accessing a memory block when a corresponding base number is communicated to the remote unit to read out the secure ID from the memory block for transmission to the base unit, means for updating the ID by transmitting a new ID from the unit base to the temporary memory block, and wherein the logic means is effective when updating the ID for relating the corresponding base number to the new ID.

BRIEF DESCRIPTION OF THE DRAWINGS

The above and other advantages of the invention will become more apparent from the following description taken in conjunction with the accompanying drawings wherein like references refer to like parts and wherein:

FIG. 5 is a time diagram of coded signals exchanged by the base and remote units, according to the invention, FIG. 6 is a chart of functions and signal exchanges for the base and remote units for vehicle access, according to the invention.

DESCRIPTION OF THE INVENTION

The ensuing description is for a system specifically designed for secure remote access to multiple vehicles via a radio link, although it should be recognized that the system is equally well suited to other applications, whether vehicular, non-vehicular or mixed. In particular, the system is described as a vehicle access system which is passively activated to unlock a door when the door handle is pulled or otherwise actuated.

Figure 1:
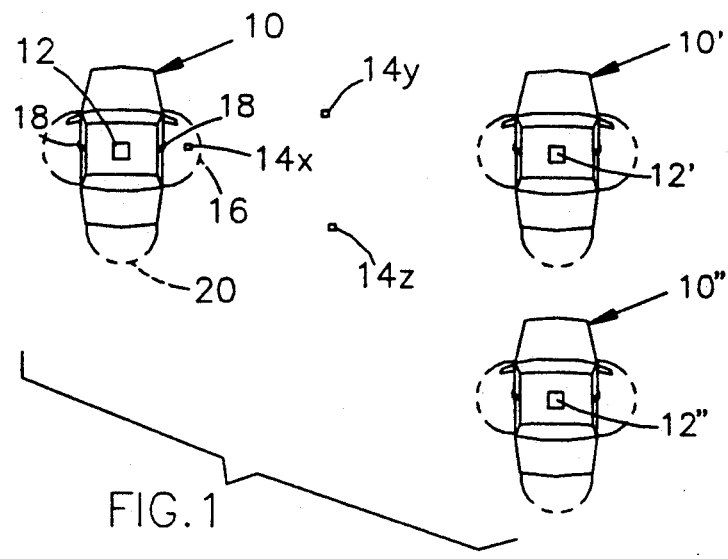
FIG. 1 is a diagram of a system of vehicle-mounted base units and remote units, according to the invention.

FIG. 1 shows a base station or vehicle 10 equipped with a remote access system including a base unit 12 in the vehicle and a remote unit 14X typically carried in the vehicle operator's pocket or purse. The units are coupled by radio communication effective over a short distance. As indicated by dotted lines 16 adjacent each vehicle door handle 18 and lines 20 adjacent the vehicle trunk, minimum distances of only a few feet are required although a larger radius of communication is acceptable. It is intended that when the operator carries the remote unit within radio range of the base unit the system will automatically act to unlock the door without activation by the operator, provided that the identification of the remote unit can be verified. In some applications the units are activated only when the operator touches or tries to operate the door handle 18. The system includes base units 12' and 12'' in other vehicles 10' and 10'' which are similar to unit 12 and operable with the remote unit 14X so that the operator carrying the remote unit has access to each of the three vehicles. Since more than one operator may use one or more of the same vehicles, there are other remote units 14Y and 14Z which may be programmed for vehicle access.

Figure 2:
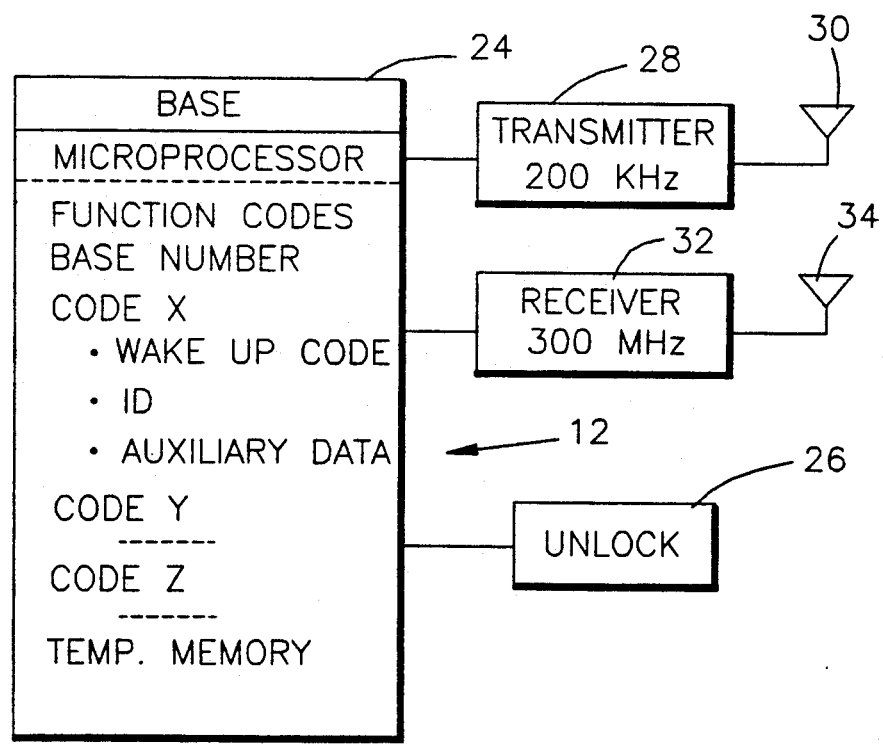
FIG. 2 is a block diagram of a base unit of the system of FIG. 1.

The base unit 12, shown in FIG. 2, has a microprocessor based control 24, at least one unlock or other function output circuit 26, a low frequency radio transmitter 28 and antenna 30 operating at 200 kHz, and a very high frequency receiver 32 and antenna 34 operating at 300 MHz. The control 24 stores several codes including a base number or password which is unique to the vehicle, and codes X, Y, and Z which relate to respective remote units 14X, 14Y and 14Z. Code X, which is typical, contains two components, a wakeup code and an identification code (ID) which are all peculiar to the remote unit 14X. The control also stores a set of function codes which are common to all the remote units. The function code, when transmitted, determines the operation to be performed in the remote unit, e.g., read out the ID or update the ID.

Figure 3:
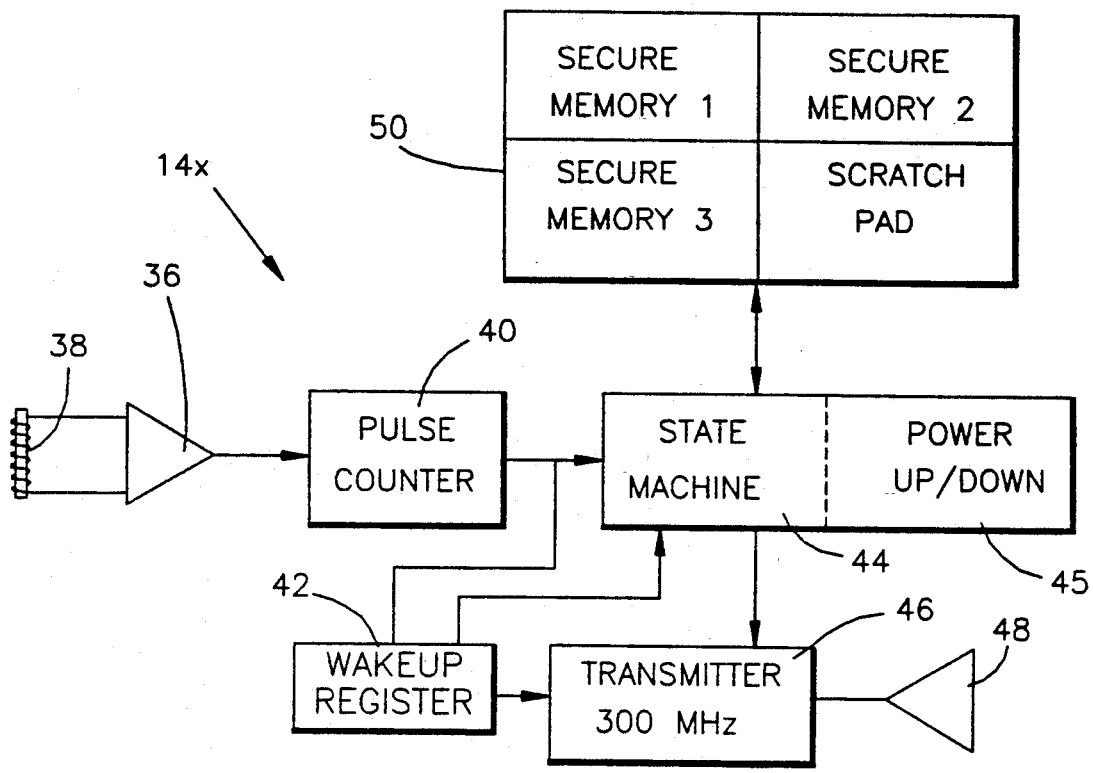
FIG. 3 is a block diagram of a remote unit of the system of FIG. 1.

The remote unit 14X, shown in FIG. 3, is like the other remote units and employs a 200 kHz receiver 36 and antenna 38 coupled thereto for receiving signals from the base unit 12. The antenna 38 is preferably a ferrite antenna capable of producing at least 3 mV signals when in the range of the base unit 12, and the receiver 36 is a comparator having its input terminals coupled across the antenna and which produces a 3 V output pulse when each 3 mV signal pulse is received.

Figure 4:
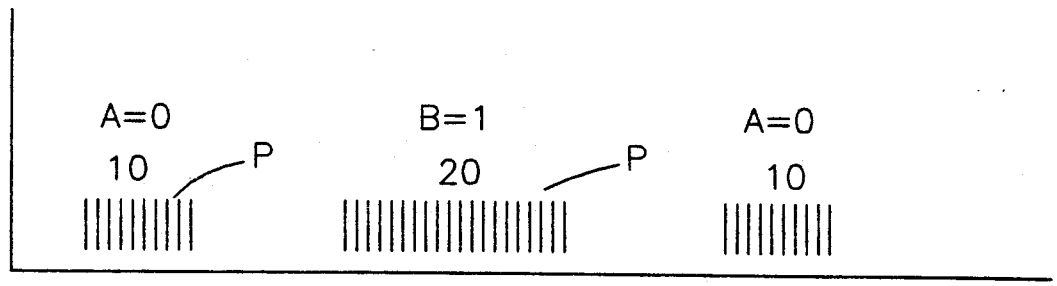
FIG. 4 is a diagram of receiver output pulse groups with corresponding symbol identification.

The LF signal is modulated by the base unit into bursts of various lengths so that the LF carrier is not continuous but is segmented into bursts. The number of cycles in each burst is counted by a pulse counter 40 connected to the output of the receiver 36. The counter translates bursts of 10, 20, 30, 40, and 50 pulses into digital symbols A, B, C, D and E, respectively. Symbols A and B comprise digital bits 0 and 1, respectively. FIG. 4 depicts three bursts of pulses P having lengths of 10, 20, and 10 pulses, respectively, to indicate symbols A, B, A or bits 0, 1, 0.

The counter output is coupled to a wakeup register 42 and to a state machine 44 which comprises a logic circuit. The wakeup register 42 is also connected to the state machine 44 and may even be a part of the state machine. Both the wakeup register 42 and the state machine 44 have outputs connected to a VHF transmitter 46 operating at 300 MHz and which is coupled to an antenna 48 for transmitting to the base unit 12. The state machine 44 incorporates a power conservation function 45 which powers down the state machine to a low current level to deactivate most of the state machine and the transmitter 46 while the unit is "asleep", leaving just enough circuitry active to receive and process a wakeup signal. When a wakeup signal bearing the correct wakeup code is received, the rest of the system is powered up for full operation.

The state machine is also connected to a memory 50 which is partitioned into several memory blocks, here shown as four blocks including three secure memory blocks, one corresponding to each base unit, and a scratch pad or temporary memory block. When the system is initially programmed, the state machine 44 determines which memory block is assigned to each vehicle and pointers are stored in the state machine to identify the correct memory address for each base number. Secure memory 1 is assigned to vehicle 10, secure memory 2 is assigned to vehicle 10', etc. Thus the transmitted base number ultimately determines which memory block is accessed. Each secure memory block contains the ID which is stored in the corresponding base unit.

Optionally, each secure memory block stores auxiliary data which might be used for any of several purposes. For example, in a vehicle which has power seats or steering wheel power adjustments with position memories for each vehicle user, the auxiliary data for a given electronic key may be codes for the positions preferred by the user of that key for each vehicle used by the user. Thus the data is both personal and vehicle specific. When the ID is retrieved from the key by the base unit, the position data can be retrieved at the same time and the data would be used to automatically position the seat and/or the steering wheel. As a second example of auxiliary data, for a vehicle equipped with a keyboard and a display screen, user appointment calendar data can be entered into the secure memory by transmission from the base unit and subsequently displayed in the same or another similarly equipped vehicle. A third example of auxiliary data applies to rental car systems. When a vehicle is parked at the rental return lot and turned off, the vehicle mileage and fuel data can be loaded into the secure memory. When the electronic key is turned in at the rental office, a base unit there can read the vehicle data to be used for bill preparation.

System operation for gaining access to a vehicle is begun by the operator pulling on the door handle of, say, vehicle 10. The base unit polls the remote units by sequentially using codes X, Y and Z to determine whether a remote unit corresponding to one of those codes is near the vehicle. FIGS. 5 and 6 illustrate the communication between the base unit 12 and the remote unit 14X. To initialize the remote unit, the base sends the symbol E. Then a wakeup command is sent in the form of a string of bits which includes the wakeup code (from code X), a base number, and a function code for vehicle access. The remote unit compares the wakeup code to the contents of the wakeup register. If there is agreement, the state machine 44 is fully energized. The base unit next sends a C symbol to reset the state machine and then sends a request ID signal. This comprises the code to instruct the state machine to access the indicated memory block containing ID for vehicle 10. Upon receipt of the correct instruction, the ID is released for transmission to the base unit. To effect the ID transmission, the base unit sends a series of A symbols or 0's and the state machine sends one bit of the ID for each received 0 until all the ID is transmitted. The base unit compares the received ID with the one stored in code X and unlocks the door if there is agreement. Whenever one code is compared to another, it is permissible to require less than 100% agreement to allow for communication error. When agreement is found, the signalling process ends. In the event the remote unit does not respond to the base unit signal or there is no agreement, the base unit repeats the procedure using code Y and again, if necessary, with code Z. When no match of ID's occurs, the process stops and access to the vehicle is denied. The entire procedure requires a small fraction of a second.

Figure 7:
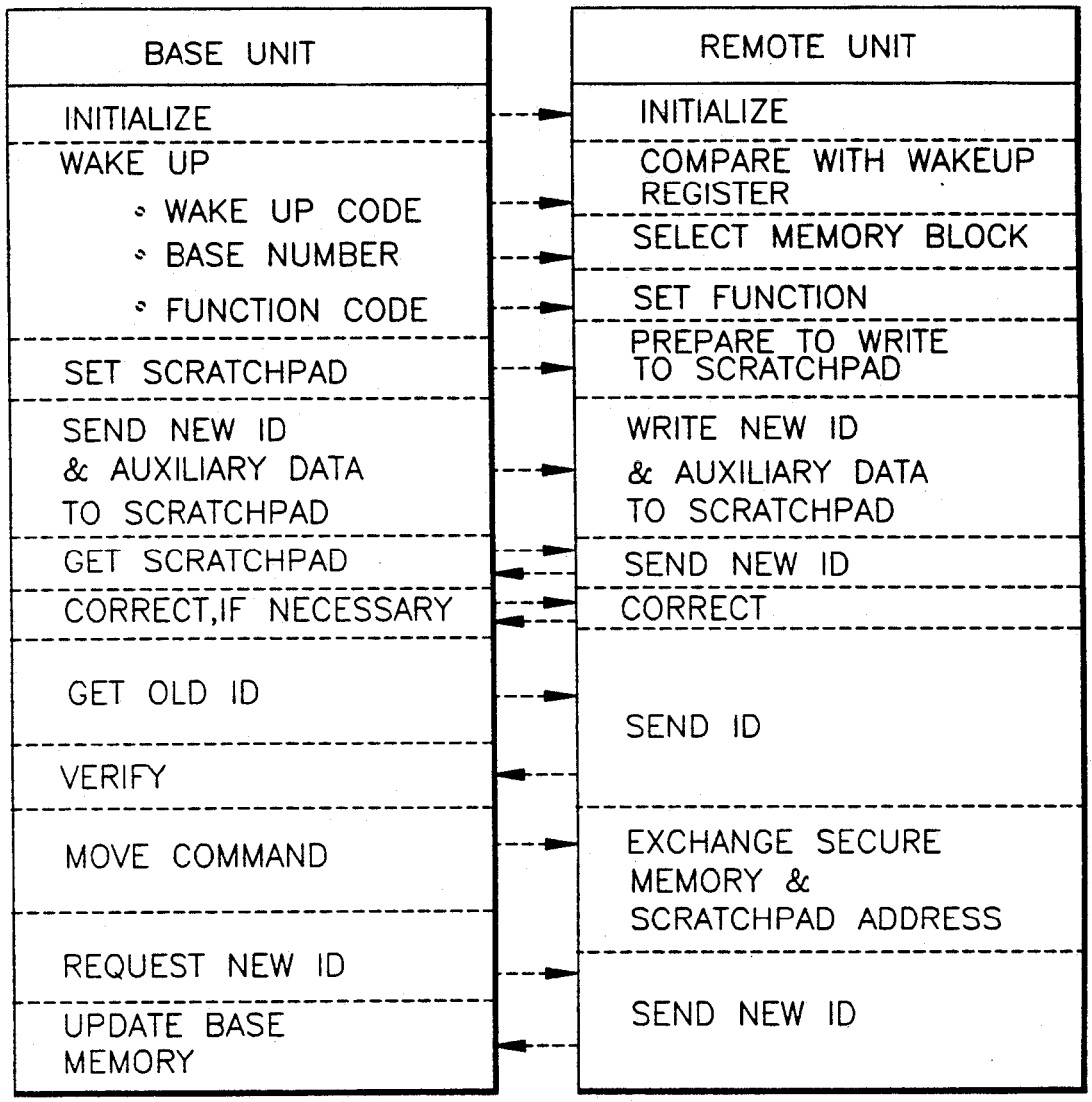
FIG. 7 is a chart of functions and signal exchanges for the base and remote units for code updating, according to the invention.
Figure 8:
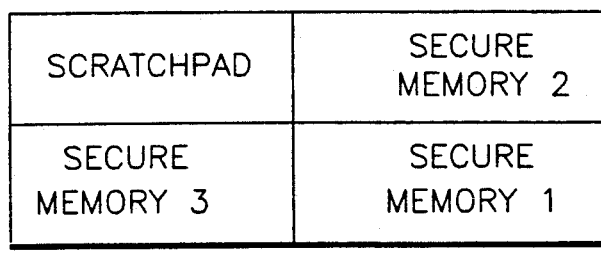
FIG. 8 is a diagram of remote unit memory locations after updating.

For improved security it is good to periodically change the ID. It is also desirable to be able to change the auxiliary data in the secure memory. These functions are initiated when the mechanical key is removed from the steering column lock. The ensuing series of events in the base and remote units is illustrated in FIG. 7. Reset commands are omitted from these charts. The initialize command and wakeup code are transmitted and responded to in the same manner as in FIG. 6. Then the base unit issues a set scratchpad command and the remote unit prepares to write to the scratchpad memory block in the memory 50. Next the base unit transmits a new ID as well as new auxiliary date which are written in the scratchpad. The base unit commands that the scratchpad contents be transmitted and in response the new ID is sent. A data correction procedure is followed if errors are present. Then the old ID is requested by the base unit. The old memory block is accessed and the old ID is sent to the base. If the ID is verified, the state machine is commanded to move the memory block which is carried out by changing pointers in the state machine so that the address which was formerly for the scratchpad now becomes the address of the secure memory block, and the old memory block location is the new scratchpad location. This is illustrated by the memory 50 diagram of FIG. 8 which may be contrasted with the memory 50 of FIG. 3. If it is desired to merely update the auxiliary data without changing the ID, the same procedure is followed but the old ID is used in place of the new ID.

The embodiments of the invention in which an exclusive property or privilege is claimed are defined as follows:

1. A system for secure entry to a plurality of vehicles, each vehicle having an ignition system activated by an ignition key coupled therewith, the system comprising:
   a plurality of base units, one for each vehicle, for controlling a vehicle function and at least one remote unit coupled to the base units for communication therewith,
   each base unit storing a unique base number and a secure remote ID,
   the remote unit having a memory partitioned into assigned memory blocks, one for each base unit, and an additional temporary memory block, each assigned memory block containing a secure ID,
   the remote unit further having logic means for selectively assigning a base number to each memory block, for writing an ID to each memory block and for accessing a memory block when a corresponding base number is communicated to the remote unit to read out the secure ID from the memory block for transmission to the base unit,
   each base unit having means for automatically initiating an update of an ID, in response to a withdrawal of the ignition key from the ignition system, by transmitting a new ID from the base unit to the remote, and
   wherein the logic means is effective, upon receipt of a new ID from a base unit, to write the new ID to the temporary memory block, to reassign the corresponding base number to the temporary memory block, and to reassign the memory block formerly containing the ID for the corresponding base number as a new temporary memory block.

2. The system of claim 1 in which each vehicle has an access door with a lock and an outside access handle and further has power unlocking apparatus for the lock, the base unit is activated by activation of the outside access handle to send its base number to the remote unit and is further effective upon receipt of an ID from the remote which matches its own stored secured remote ID to activate the power unlocking apparatus.

* * * * *